(No Model.) 3 Sheets—Sheet 1.
D. C. RUTH.
BAND CUTTER AND FEEDER FOR THRASHING MACHINES.
No. 503,002. Patented Aug. 8, 1893.
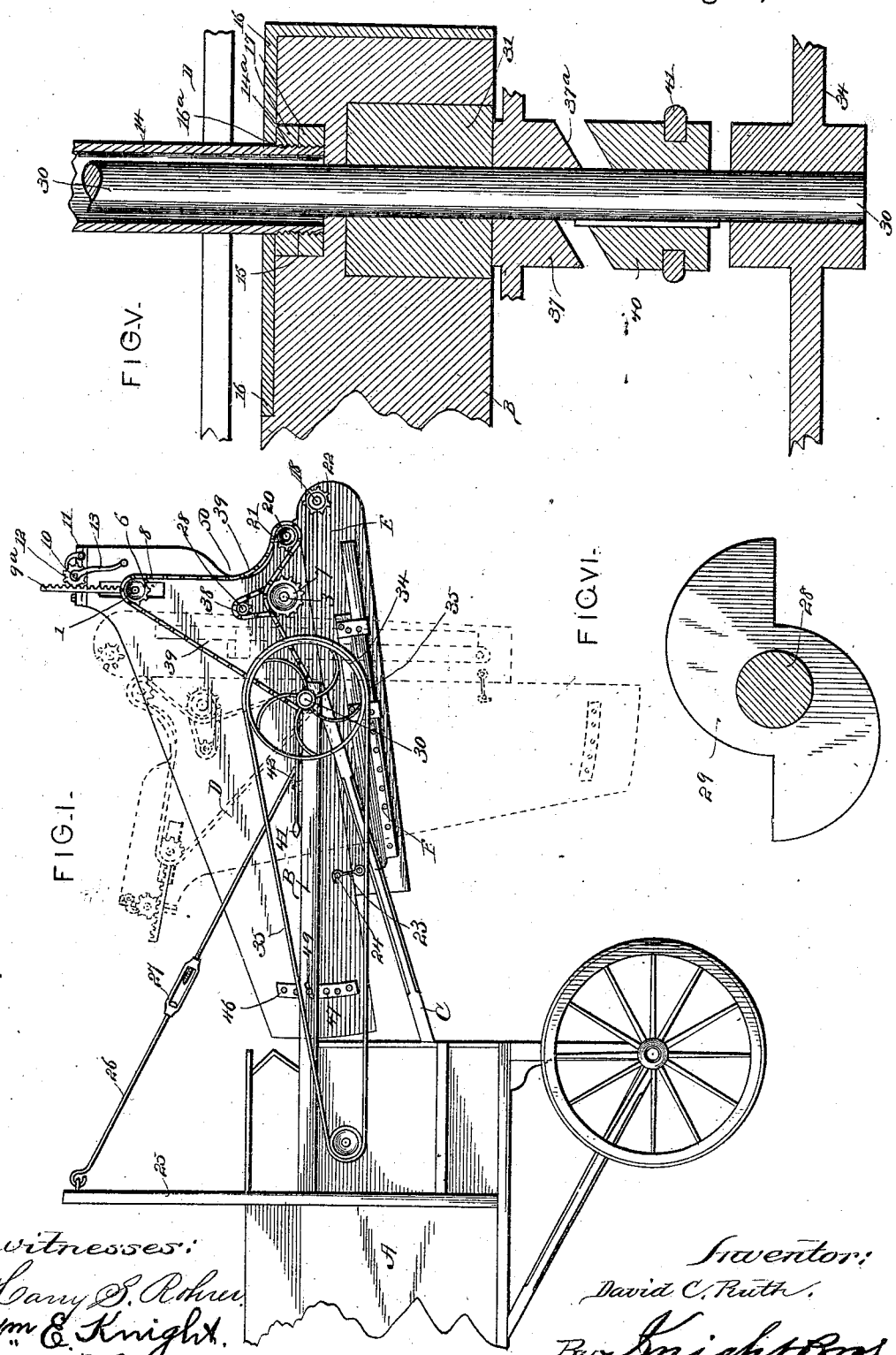

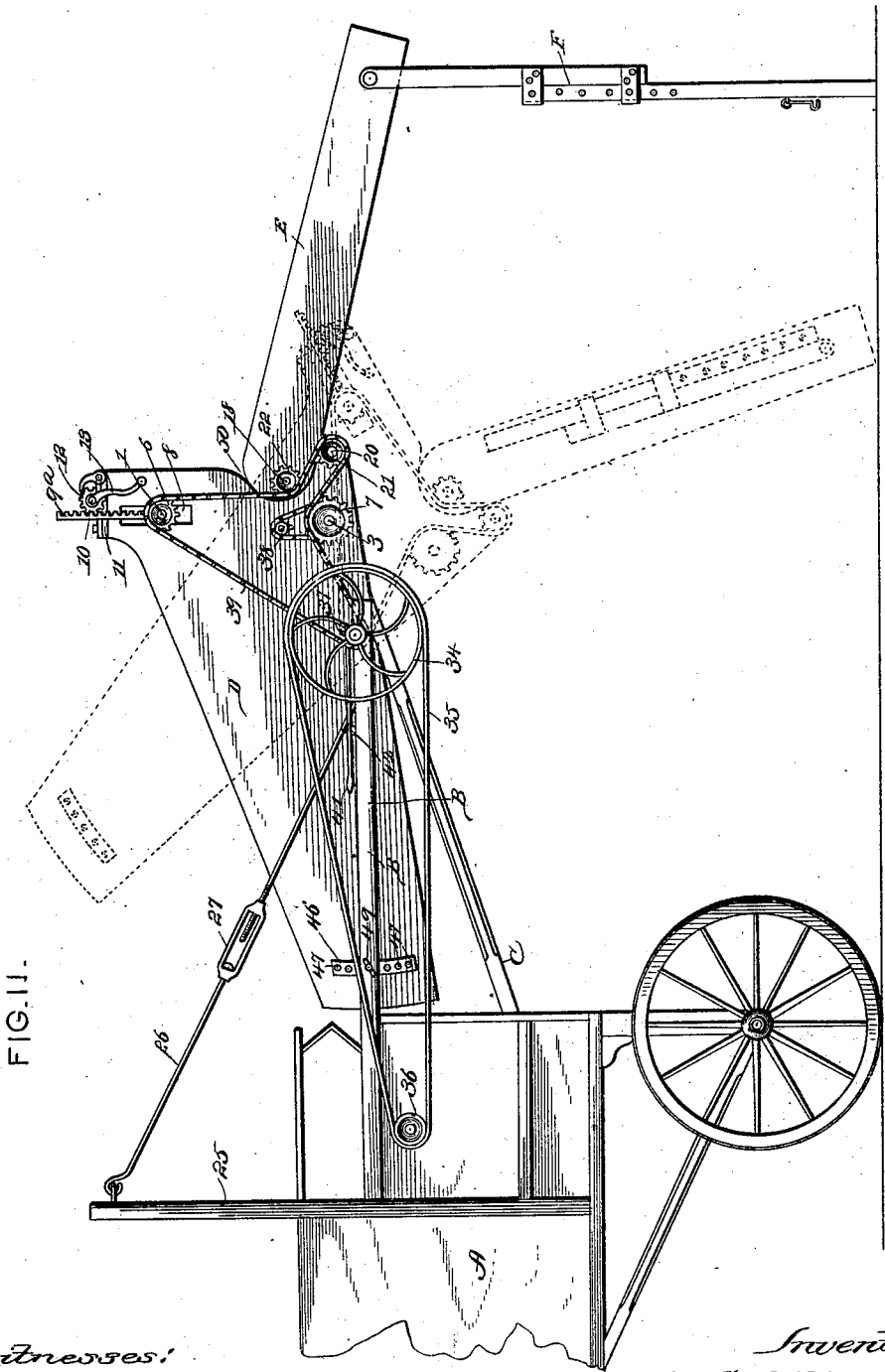

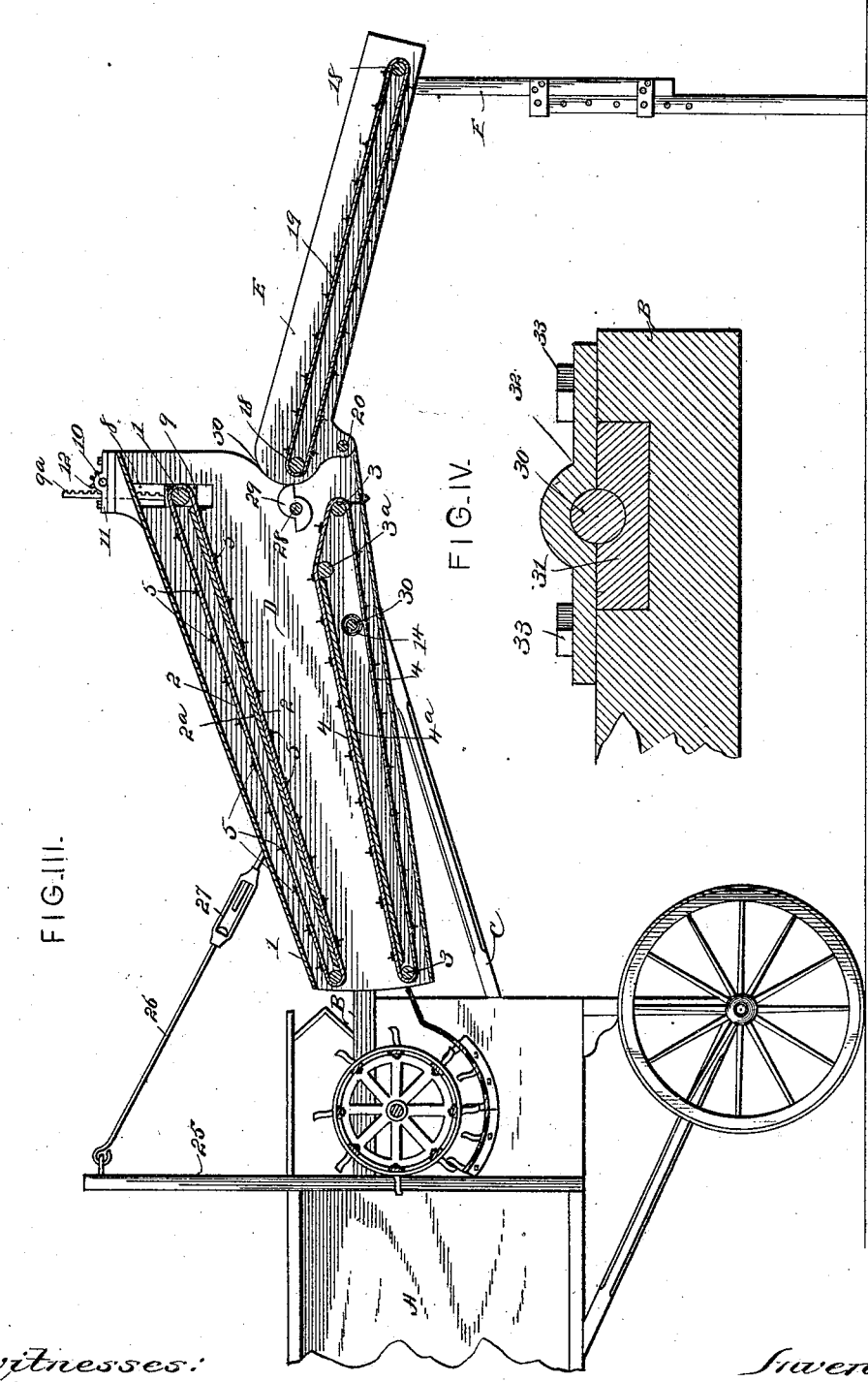

UNITED STATES PATENT OFFICE.

DAVID C. RUTH, OF HALSTEAD, KANSAS.

BAND-CUTTER AND FEEDER FOR THRASHING-MACHINES.

SPECIFICATION forming part of Letters Patent No. 503,002, dated August 8, 1893.

Application filed June 24, 1892. Serial No. 437,869. (No model.)

*To all whom it may concern:*

Be it known that I, DAVID C. RUTH, a citizen of the United States, residing at Halstead, in the county of Harvey and State of Kansas, have invented certain new and useful Improvements in Band-Cutters and Feeders for Thrashing-Machines; and I do hereby declare that the following specification, taken in connection with the accompanying drawings, is a full, clear, and exact description, such as will enable those skilled in the art to make and use the same.

My invention relates to certain new mechanical arrangements in the structure of the band cutter and feeder attachment of a thrashing machine, and is especially designed to render the parts more readily accessible for cleaning and repair.

My improvements will first be described with reference to the accompanying drawings and then more particularly pointed out in the claims.

In said drawings, Figure I is a side elevation of my improved band cutter and feeder attachment in folded position, ready for transportation, and representing by dotted lines its vertical position which renders the concave and cylinder readily accessible. Fig. II is a similar view showing the parts in operative position and representing by dotted lines the deflected position. Fig. III is a longitudinal sectional view. Figs. IV and V are enlarged detail sectional views more clearly illustrating parts of the structure. Fig. VI is an enlarged detail view of the preferred form of rotary knife or cutter.

Like letters and figures of reference indicate the same parts throughout the several views.

A is a thrashing machine of any approved construction provided at its forward end with the usual cylinder and concave adapted to receive the grain to be thrashed.

Extending from the machine on each side of its mouth, which leads to the cylinder and concave, are two stout horizontal beams or supports B, B, upon which is journaled in a peculiar manner the band cutter and feeder attachment. The beams B, B, are braced by auxiliary supporting rods or timbers C, C.

D is the frame or case of the band cutter and feeder attachment formed of side pieces and top and bottom pieces secured together in any suitable manner and open at both ends for the passage of the grain.

1, 1, are supporting rollers around which travels the upper endless feeding apron 2, and 3, 3, are supporting rollers around which travels the lower endless feeding apron 4; said aprons being arranged at an angle to each other as shown, and the upper one 2 being provided with a series of knives 5 and geared so as to travel at a greater speed than the lower one for the purpose of separating the bundle of grain.

$3^a$ is an idle roller for properly guiding the lower endless belt and forming the space in which the rotary knives can revolve as shown in the drawings. The journal ends of the outer supporting rollers 1 and 3 are extended beyond the right side of the casing, and provided with sprocket wheels 6, 7, respectively; the sprocket wheel 6 upon the upper roller 1 being smaller than the sprocket wheel 7 on the lower roller 3 for the purpose of driving the upper belt at a greater speed. The gearing for operating these sprockets will be hereinafter referred to.

$2^a$ is a flooring or guide wall secured to the sides of the frame D between the rollers 1 for the purpose of pressing down the upper endless feeding apron upon the grain as it passes to the cylinder, and $4^a$ is a similar guide wall between the rollers 3 for pressing the endless apron 4 up against the grain. The outer supporting roller 1 should be mounted in adjustable bearings to render it adjustable to suit the varying condition of the grain. For this purpose I prefer to form the sides of the casing D with slots 8, in which are supported vertically movable journal blocks 9 having the journal ends of the outer roller 1 journaled therein.

$9^a$ are rack bars extending up from the blocks 9.

10 is a cross-shaft journaled in suitable bearings 11 at the top of the frame D, and provided with pinions 12 at its opposite ends which engage the racks $9^a$.

13 is a crank keyed to one end of the cross-shaft 10. By turning the crank 13 in opposite directions the roller 1 can be raised and lowered. This will also serve to tighten and loosen the endless chain which operates the endless belts. The outer end of the upper guide wall 2ª is secured to the sliding blocks 9 so that it will be carried up or down by the adjustment of the roller.

14 is a tubular shaft which passes through and projects from the side pieces of the frame D at points approximately mid-way between its ends and nearer the outer end, for the purpose of pivotally supporting the attachment so that it can swing away from the thrasher. The tubular shaft is formed with screw threaded ends 14ª.

In the inner faces of the supporting beams B, B, near their ends are formed recesses 15, 15.

16 are iron braces or plates shaped to fit the ends and a portion of the inner faces of the beams B, B, as shown, and formed with openings 16ª for the passage of the threaded ends 14ª of the tubular shaft 14.

17, 17, are lock nuts adapted to engage the threaded ends 14ª of the tubular shaft 14 and prevent the withdrawal of the same from the plates 16. The plates 16 are then securely attached to the beams B, B, as shown and the band cutter and feeder attachment will be pivotally supported.

25 are vertical posts extending up from the sides of the thrasher A, and 26 are brace rods extending from the posts 25 to the ends of the beams B, B, for bracing them. The rods 26 are provided with adjustable turn-buckles 27.

E is the auxiliary feeder attachment consisting as usual of a suitable frame supporting at its opposite ends the endless belt rollers 18, 18, upon which travels the endless belt feeding apron 19. This attachment E is journaled at its forward end upon a cross shaft 20 which passes through the side pieces of the main feeder attachment D and lugs or ears on the auxiliary attachment E. The shaft 20 is provided with a sprocket wheel 21 on its projecting end as shown. The right journal end of the upper roller 18 is also provided with a sprocket wheel 22.

The attachment E is provided with pivoted extensible supporting legs F at its free end to hold it in elevated position and regulate its angle.

The attachment E is adapted to be folded up underneath the frame D, and held in place against the bottom thereof by means of hooks 23 pivoted to the frame E and adapted to engage pins 24 on the sides of the frame D.

28 is a cross-shaft journaled in the sides of the main feeder attachment D and provided at short intervals with knives or cutters 29 of peculiar construction. Each one of these cutters is formed of two oppositely extending semi-circular disks which overlap and are secured to a common central hub, and have their curved cutting edges extending from the opposite sides of said hub. I prefer to form these cutters of a single piece of steel, but they can be formed of two overlapping pieces if preferred. This series of cutters is arranged in the enlarged end of the main feeder attachment adjacent to the auxiliary feeder, and the bundles of grain are delivered from said auxiliary feeder to the rotary cutters which sever the bands just before the grain is deposited between the main feeding aprons.

30 is the main shaft passing through the tubular shaft 14 and journaled on the upper faces of the supporting beams B, B, in the journal boxes 31. The shafts are held in place in said boxes by the metal caps 32 secured to the beams by bolts 33. To the outer end of said shaft 30 is keyed a band pulley 34 over which passes the band 35 driven by the drive pulley 36 on the shaft of the cylinder. Said cylinder is driven in any of the usual ways.

37 is a sprocket wheel loosely mounted upon the main shaft 30 just outside of one of the supporting beams B.

38 is a sprocket wheel on the outer end of the cross shaft 28 which carries the rotary cutters.

39 is an endless sprocket chain engaging the sprocket wheels 6, 22, 21, 7 and 37 for driving the rollers and shafts upon which they are mounted.

40 is a movable clutch splined to the shaft 30 adjacent to the pulley 34 and formed with an inner clutch face which is adapted to engage the outer clutch face 37ª of the sprocket wheel 37.

41 is a forked lever engaging the clutch 40 and pivoted to the supporting beam B at 42, whereby said clutch can be moved into and out of engagement with the sprocket wheel 37 for throwing the attachment into and out of operation.

38 is the sprocket wheel keyed to the outer end of the cutter shaft 28, and 44 is a sprocket chain passing around said sprocket wheel 38 and gearing with a sprocket wheel mounted on the journal end of the roller 3 inside of the sprocket wheel 7. By this arrangement it will be observed that the two main feeding aprons and the auxiliary feeding aprons are all run from the same power shaft, and that they can be thrown out of operation without stopping the thrashing machine by simply shifting the controlling clutch.

In Fig. II of the drawings I have represented by dotted lines the feeder attachment deflected upward which illustrates one position to which the attachment can be shifted for convenience of cleaning or repairing the cylinder and concave. In Fig. I, I have shown by dotted lines another position which the attachment can assume for cleaning or repairing the cylinder and concave. If preferred the attachment can be made to assume this vertical position when transporting the machine though it is considered better to have it secured in horizontal position as shown in full lines in Fig. I.

46 are metal plates formed with a series of holes 47 and attached to the side pieces of the frame D.

48 are perforations through the supporting beam B and 49 are pins adapted to pass through the perforations 48 and engage the perforations 47 in the plates and hold the band cutter and feed attachment at any desired angle. It will be observed that by supporting the band cutter and feed attachment upon the center through which the shaft 30 passes the attachment can be shifted to any position without slackening the main driving belt. It will also be observed that the sprocket wheel 22 engages on the outside of the sprocket chain 39 and therefore does not obstruct the movement of the auxiliary feeder when it is moved on its pivot. The rear portions of the side frame of the main attachment are cut away as shown at 50 to allow room for the upper endless belt roller 18.

The results above defined are very important and render the device very simple of structure and easy of manipulation and repair. If desired the whole attachment can be removed from its bearings by simply taking off the caps from the journal boxes.

Having thus fully described the nature of my invention, the following is what I claim as new therein and desire to secure by Letters Patent:

1. The combination of the thrasher frame, the band-cutter and feeder attachment provided with supporting pivots projecting from its sides at points between its ends and nearer to its outer or forward end, suitable bearings upon the thrasher frame in which the supporting pivots are journaled, suitable means of engagement between the inner end of the pivoted attachment and the thrasher frame, and means for operating the attachment, whereby the attachment can be held at any desired operative angle or allowed to swing away from the thrasher into vertical position, substantially as and for the purpose herein set forth.

2. The combination of the thrashing machine provided with a supporting frame projecting therefrom, the band cutter and feeder attachment pivoted thereto and provided with a pair of co-operating feeding aprons supported on suitable rollers, sprocket wheels on the projecting journal ends of the driving rollers, a main drive shaft journaled to rotate on the center upon which the attachment is pivoted and provided with a sprocket wheel, the auxiliary feeder attachment pivoted to the main feeder and provided with a sprocket wheel on the projecting journal end of its driving roller, a sprocket chain engaging said sprocket wheels, a drive pulley on the drive shaft, and a band communicating power from the thrashing machine to the power shaft, substantially as set forth.

3. The combination of the thrashing machine provided with a supporting frame projecting therefrom, a band-cutter and feeder attachment provided with supporting pivots projecting from its sides between its ends and journaled in the supporting frame, a series of perforations in the sides of the attachment, perforations in the supporting frame with which they register and a pin adapted to enter said perforations for holding the attachment at the desired angle, substantially as and for the purpose set forth.

4. The combination of the thrashing machine having the supporting frame projecting therefrom, a band cutter and feeder attachment, a tubular shaft passing through said band cutter and feeder attachment and having threaded ends, recesses in the supporting frame, metal plates covering said recesses and having openings for the passage of the shaft, lock nuts engaging the ends of the tubular shaft and said metal plates, the drive shaft journaled in said tubular shaft, a drive pulley on said shaft, a band communicating between the thrasher and said pulley, and suitable gearing between said shaft and the operative parts of the attachment substantially as set forth.

5. The combination of the thrashing machine having the supporting frame projecting therefrom, a band cutter and feeder attachment pivotally supported upon said frame at points between its ends, co-operating feeding aprons supported on suitable rollers, sprocket wheels on the projecting journal ends of the driving rollers, a main drive shaft journaled to rotate on the center upon which the attachment is pivoted and provided with a sprocket wheel, a sprocket chain engaging said sprocket wheels, the auxiliary feeder attachment pivoted at the outer end of the main feeder and adapted to be folded back under the main feeder, a sprocket wheel on the projecting journal of the drive roller of the auxiliary feeder attachment adapted to engage the sprocket chain, and suitable means for transmitting power from the thrashing machine to the main feeder shaft, substantially as set forth.

DAVID C. RUTH.

Witnesses:
J. I. JARRETT,
J. B. LEHMANN.